(12) United States Patent
de Souza (10) Patent No.: US 7,475,062 B2
(45) Date of Patent: Jan. 6, 2009

(54) APPARATUS AND METHOD FOR SELECTING A SUBSET OF REPORT TEMPLATES BASED ON SPECIFIED CRITERIA

(75) Inventor: Pedro Sérgio de Souza, Flower Mound, TX (US)

(73) Assignee: Business Objects Software Ltd., Dublin (IE)

( * ) Notice: Subject to any disclaimer, the term of this patent is extended or adjusted under 35 U.S.C. 154(b) by 255 days.

(21) Appl. No.: 11/365,477

(22) Filed: Feb. 28, 2006

(65) Prior Publication Data

US 2007/0203935 A1   Aug. 30, 2007

(51) Int. Cl.
 *G06F 17/30* (2006.01)
(52) U.S. Cl. .................. 707/3; 707/5; 715/235
(58) Field of Classification Search ................ 707/100, 707/3, 5, 200; 715/212, 235
See application file for complete search history.

(56) References Cited

U.S. PATENT DOCUMENTS

| 6,993,533 | B1 * | 1/2006 | Barnes ..................... 707/102 |
| 7,188,100 | B2 * | 3/2007 | De Bellis et al. ............... 707/3 |
| 2003/0069877 | A1 | 4/2003 | Grefenstette et al. .......... 707/2 |
| 2004/0006738 | A1 | 1/2004 | Szabo et al. ................ 715/255 |
| 2004/0024739 | A1 | 2/2004 | Copperman et al. ........... 707/2 |
| 2005/0273311 | A1 | 12/2005 | Lautt et al. .................... 703/22 |
| 2005/0278297 | A1 | 12/2005 | Nelson .......................... 707/1 |
| 2006/0026122 | A1 | 2/2006 | Hurwood et al. ............... 707/1 |
| 2007/0179975 | A1 * | 8/2007 | Teh et al. .................. 707/104.1 |

* cited by examiner

*Primary Examiner*—Cheryl Lewis
(74) *Attorney, Agent, or Firm*—Cooley Godward Kronish LLP (57) ABSTRACT

A computer readable medium with executable instructions, includes instructions to process metadata associated with a set of report templates. A subset of report templates is selected from the set of report templates using the metadata. The subset of report templates maximizes a reporting objective subject to a selection rule as specified by the metadata. The subset of report templates is returned.

17 Claims, 7 Drawing Sheets

| Parameter Type | Parameter Value |
|---|---|
| Priority of Question QA | 3 |
| Priority of Question QB | 1 |
| Priority of Question QC | 8 |
| Rule | Can't have more than 2 reports from same category. |
| Rule | Can't spend more than $10,000. |
| Objective | Find subset best fit to answer the questions of the customer. |

402

|  | Report A | Report B | Report C | Report D | Report E |
|---|---|---|---|---|---|
| Cost | $4000 | $2500 | $3000 | $2000 | $6000 |
| Category | Operations | Marketing | Marketing | Marketing | Operations |
| Question QA | 9 | 4 | 0 | 0 | 2 |
| Question QB | 1 | 4 | 7 | 0 | 8 |
| Question QC | 1 | 5 | 6 | 10 | 0 |

410

|  | Report A | Report B | Report C | Report D | Report E |
|---|---|---|---|---|---|
| Value | 3.6 | 5.6 | 5.5 | 8.0 | 1.4 |

412

|  | Report A | Report B | Report C | Report E |
|---|---|---|---|---|
| Value | 3.6 | 5.6 | 5.5 | 1.4 |

414

|  | Report A | Report E |
|---|---|---|
| Value | 3.6 | 1.4 |

420

|  | Report D | Report B | Report A |
|---|---|---|---|
| Cost | $2000 | $2500 | $4000 |
| Category | Marketing | Marketing | Operations |
| Value | 8.0 | 5.6 | 3.6 |

| Parameter Type | Parameter Value |
|---|---|
| Priority of Question QA | 9 |
| Priority of Question QB | 5 |
| Priority of Question QC | 3 |
| Rule | Can't spend more than $15,000. |
| Objective | Find subset best fit to maximize return on investment, maximize value, and minimize cost. |

600

| | Report F | Report G | Report H | Report I |
|---|---|---|---|---|
| Cost | $4000 | $2500 | $6000 | $7500 |
| Return | $16000 | $17500 | $10000 | $15000 |
| Question QA | 9 | 4 | 0 | 0 |
| Question QB | 1 | 4 | 7 | 0 |
| Question QC | 1 | 5 | 6 | 10 |

602

| | Cost | Return | ROI | Value |
|---|---|---|---|---|
| F, G | $6500 | $33500 | 4.15 | 16.0 |
| G, H | $8500 | $27500 | 2.24 | 12.4 |
| G, I | $10000 | $32500 | 2.25 | 10.1 |
| H, I | $13500 | $25000 | 0.85 | 8.3 |
| I, F | $11500 | $31000 | 1.70 | 11.9 |
| F, H | $10000 | $26000 | 1.60 | 14.2 |
| F, G, H | $12500 | $43500 | 2.48 | 21.3 |
| G, H, I | $16000 | $42500 | 1.66 | 15.4 |
| H, I, F | $17500 | $41000 | 1.34 | 17.2 |
| I, F, G | $14000 | $48500 | 2.46 | 19.0 |

APPARATUS AND METHOD FOR SELECTING A SUBSET OF REPORT TEMPLATES BASED ON SPECIFIED CRITERIA

BRIEF DESCRIPTION OF THE INVENTION

This invention relates generally to data processing, storage and retrieval. More particularly, this invention relates to a technique for selecting a subset of report templates from a plurality of report templates based on a set of criteria.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

Another business intelligence tool is an analytic. An analytic is a tool for a specific data analysis activity. An analytic application is software designed for a specific data analysis need. Analytic applications are often sold as turn key solutions. One reason for this is that the data to be analyzed needs to conform to a specific schema. That is, each analytic in an analytic application has an underlying table for a particular schema. Analytic applications are often targeted toward a specific industry, or activity, e.g., BusinessObjects Supply Chain Intelligence™ is an analytic application for analyzing supply chains.

Producers of report generation tools, and third parties, may act as report vendors to a BI customer. Report vendors offer report templates to create reports for customers. A report template is combined with data to create a report. Reports can answer questions the customer may have about their organization. Information obtained from reports leads to improved performance. An example is improved financial performance, e.g., through increasing sales or decreasing costs. However, due to the complexity of how the report templates are priced and implementation costs, it is difficult for customers to determine which subset of report templates to purchase or implement. Even the seemingly simple task of determining which reports in a suite would best answer the particular business questions customers have may prove difficult when additional business constraints are involved.

A vendor and a customer deciding on which set of reports meet the customer's needs encounter various problems. One problem is where a customer has a set of previously purchased and unimplemented report templates and determines, independent of the vendor, which reports to implement. Another problem is where the person seeking the optimal subset of reports is not the customer but is the vendor. These problems can be generally regarded as one of a vendor and customer deciding on which set of reports meets the customer's needs A customer may ask a series of questions in order to determine which reports best suit specified needs. A customer may ask one of the following questions. Would adding Report A or Report B to the deployment increase return on investment? If Report C were replaced by Report D, would total return increase? What would be the optimal sub set of reports if the budget is cut, or spread out over two quarters? Which report should be retained?

The task of analyzing which report templates best meet customers' needs becomes even more difficult when there are inter-report template dependencies and synergies, diminished returns given existing reports, business constraints, etc. While evaluating the value and suitability of a single report template independent from all other report templates may seem like a manageable task, taking the entire suite of report templates into consideration when deciding on a subset of report templates to deploy is believed to be a complex task.

In view of the foregoing, it would be desirable to provide for a new a method and apparatus for determining which reports best suit the needs of a report user. In particular, it would be desirable to provide a method and an apparatus for selecting a subset of report templates from a plurality of report templates based on a set of criteria.

SUMMARY OF THE INVENTION

The invention includes a computer readable medium with executable instructions to process metadata associated with a set of report templates. A subset of report templates is selected from the set of report templates using the metadata. The subset of report templates maximizes a reporting objective subject to a selection rule as specified by the metadata. The subset of report templates is returned.

The invention also includes a computer implemented method specifying a reporting objective; receiving metadata for a first set of report templates; and applying the reporting objective to select a subset of report templates from the first set of report templates based on the metadata.

The above embodiments of the present invention may also comprise one or more additional aspects. These aspects include the following. An aspect of the present invention is that the selection of a subset of report templates utilizes an iterative selection or a greedy selection process. An aspect of the invention is that the selection of a subset of report templates utilizes a global selection process. An aspect of the invention is that the selection of a subset of report templates utilizes an optimized search over a plurality of subsets drawn from a set of report templates. Another aspect of the present invention is that a subset of report templates can be selected that meet a reporting objective. Still another aspect of the present invention is that a subset of report templates can be selected that meet a reporting objective subject to a selection rule. Yet another aspect of the present invention is that a subset of report templates is selected that meets the reporting objective of a customer. An aspect of the invention is that the subset of report templates can be offered for sale to a customer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Various features associated with the operation of the present invention will now be set forth. Prior to such description, a glossary of terms used throughout this description is provided.

Measure: a quantity as ascertained by comparison with a standard. Some examples of measures include: return, cost, and capitalization period. A measure can be obtained by a computer by accessing a stored value.

Metadata: data characterizing data. Two types of metadata are referenced in this application.

Static metadata: metadata associated with each report template that is invariant across a selection of report templates. That is, as report templates are placed in a subset of report templates, the metadata does not change. This type of metadata can include the category of the report template, e.g., finance, operations, and marketing, it may include descriptors, e.g., weekly report, and inter-report dependencies.

Dynamic metadata: metadata that changes with selection of a report template from a set of report templates. This type of metadata can include metrics, e.g., a value metric. Dynamic metadata can be associated with a set of report templates.

Metric: A quantity computed from a formula containing one or more measures and/or constants. For example, return on investment (ROI) is a metric, comprising: an investment measure and a return measure. Linear ROI is defined as defined as (return/investment)−1.

Question: criteria specifying information a user of a reporting system requests. This information though unknown can be can be framed in terms of a query. Questions can be related to business activities or other activities. Examples include:

How much inventory does my business have?

How accurate is my forecast?

Who are my top customers, e.g., top twenty by revenue, volume, or profit?

Reporting Objective or Objective: A goal that guides the selection of a subset of templates from a set of templates. Examples of objectives include: the most total returns, the highest return on investment, the lowest costs, cost in accordance with budget, the shortest capitalization period, the most operating cost reduction.

Selection Rule or Rule: A restriction, often in the form of one or more logical conditions, that must hold when selecting a report template for a subset of report templates.

Template or Report Template: Information specifying the organization of data in a report. The information does not include external data, either saved within the report or specified by the report.

Figure 1:
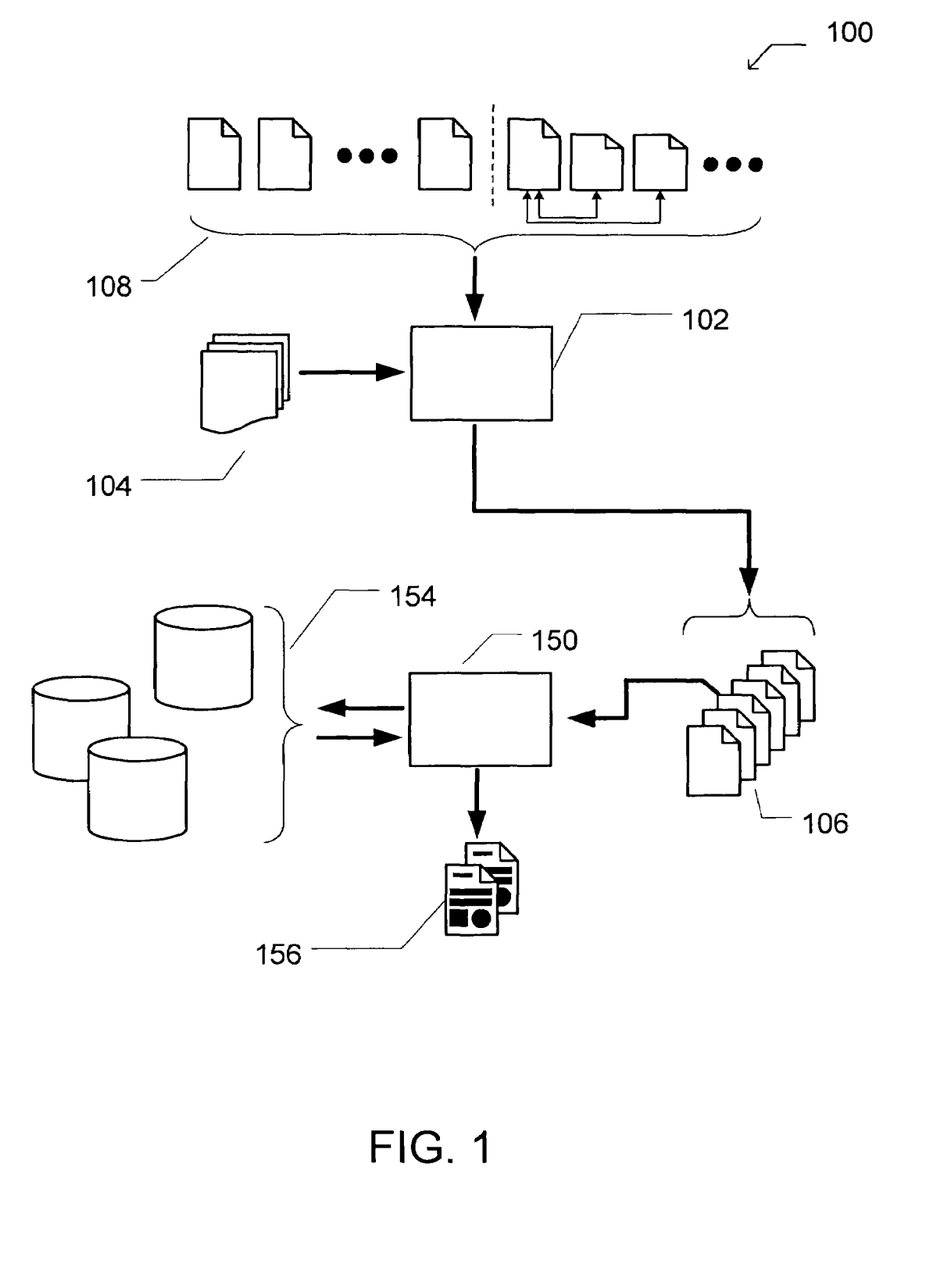
FIG. 1 illustrates an overview of a system for selecting a subset of report templates from a set of report templates.

FIG. 1 illustrates an overview of a system 100 for selecting a subset of report templates from a set of report templates. In accordance with an embodiment of the present invention, a report template selection engine 102 determines which report templates best fit a set of needs. The report template selection engine 102 accepts a set of parameters 104 to filter out a subset of report templates 106 from a set of report templates 108.

FIG. 1 also illustrates the operation of a reporting system 150. The selected subset of report templates 106 can be supplied as input to the reporting system 150. The selected subset of report templates 106 may require configuration prior to being used (configuration process not shown). Reporting system 150 queries a data source 154 (e.g., one or more databases (shown), or a plurality of reports) to create one or more instances of a report 156 with data from the data source. Multiple instances of a report can be associated with a single report template; the instances can be identical or differ from each other in their execution date, or the like. The function of reporting system 150 is well known in the art.

Figure 2:
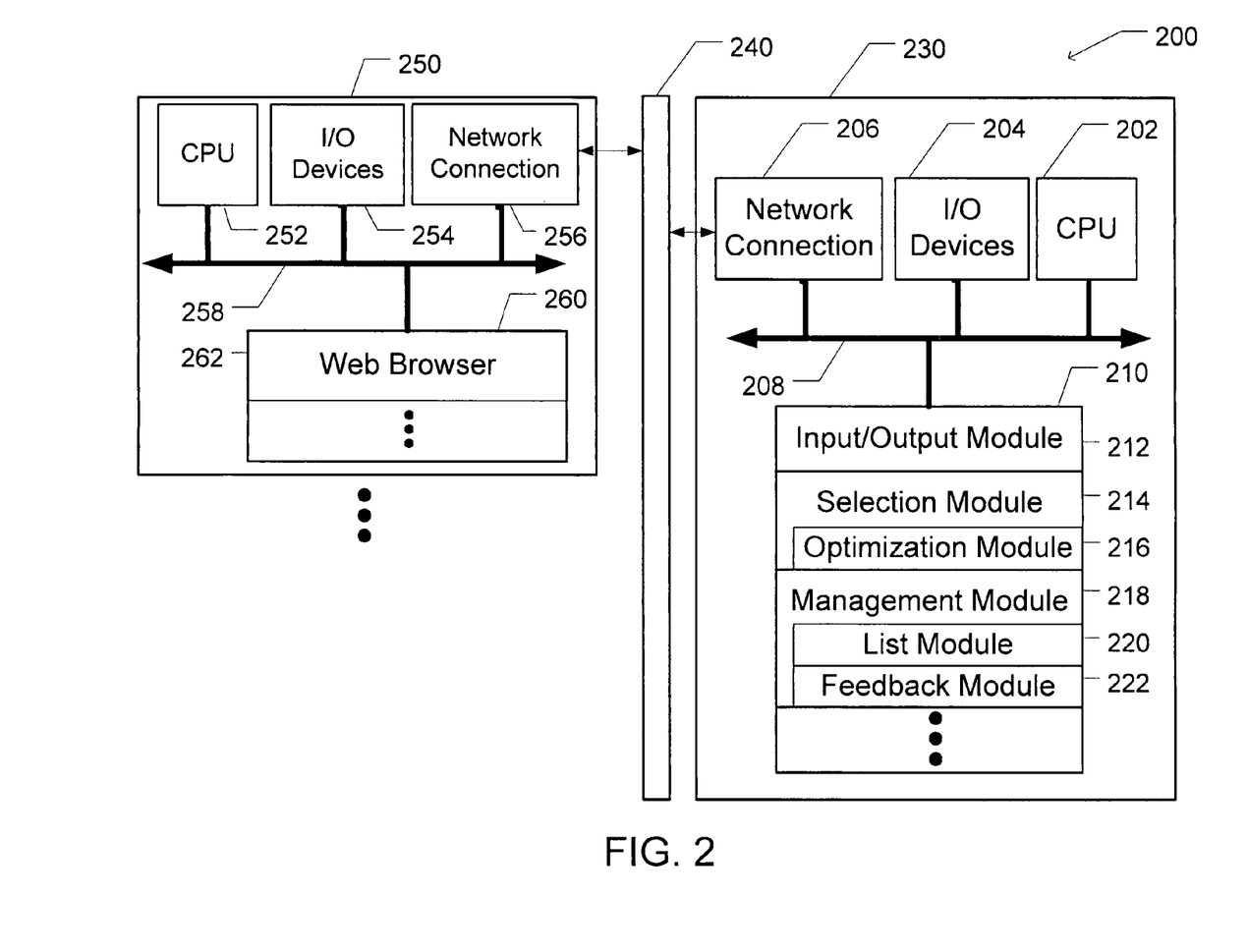
FIG. 2 illustrates a computing system configured in accordance with an embodiment of the invention.

FIG. 2 illustrates a system 200 configured in accordance with an embodiment of the invention. The system 200 includes one or more computers arranged in accordance with a client-server architecture. The system 200 includes a client-side with one or more client computers, e.g., 250, and a server-side with one or more server computers, e.g., 230, linked by a communication channel 240. A data signal embodied in a carrier wave can be sent from the server-side to the client-side and vice versa, through the communication channel 240.

In system 200, each server computer, e.g., 230, includes a central processing unit 202 connected to a set of input/output devices 204 and a network connection 206 via a bus 208. The input/output devices 204 may include standard components, such as keyboard, mouse, display, printer, and the like. The network connection 206 provides connectivity to communication channel 240. Also connected to the bus 208 is a memory 210. The memory 210 stores executable instructions to implement operations of the invention. In particular, the memory 210 may store one possible implementation of a selection engine, including executable instructions for: an Input/Output Module 212; a Selection Module 214; an Optimization Module 216; a Management Module 218; a List Module 220; and/or a Feedback Module 222. The Input/Output Module 212 includes instructions for input and output operations. The Selection Module 214 includes instructions for selecting a subset of report templates from a set of report templates. The Optimization Module 216 which works with the Selection Module 214 includes instructions for selecting an optimal (or near optimal) subset of report templates. The Management Module 218 includes executable instructions for managing the set of report templates and the metadata created for report templates. The List Module 220 includes instructions for managing the set of report templates. The Feedback Module 222 includes instructions for collecting and processing metadata created for report templates.

In system 200, each client computer, e.g., 250, includes a set of input/output devices 254 and a network connection 256 connected via a bus 258. The client computer may include a central processing unit 252 connected to the bus 258. The network connection 256 connects each client computer on the client-side to communication channel 240. Also connected to the bus 258 is a memory 260. The memory 260 stores executable instructions to implement or access operations of the invention. The memory 260 may store executable instructions for a web browser 262. The client may be a thin client that runs virtual machine code, includes a plugin to an existing program, such as a web browser, or displays a markup language supplied by the server-side.

The modules stored in system memory 210 and memory 260 are exemplary. Additional modules such as an operating system can be included. It should be appreciated that the functions of the presented modules may be combined. In addition, a function of a module need not be performed on a single machine, e.g., a server computer or client computer. Instead, the function may be distributed across system 200 or a wider network, if desired. In an embodiment of the present invention, the system 200 may operate in a non-client/server architecture unifying the modules and operations associated with both the client-side or server-side of system 200 as shown.

In an embodiment of the present invention, report templates are selected from a set of report templates until a suitable subset of report templates is identified. The subset of report templates is created over several iterations. At each round, Selection Module 214, selects the report template which best fits the customers needs as defined by a set of questions. Alternatively, at each round the report template which best fits the customer's needs is defined by a selected metric or measure. Another embodiment of the present invention uses Optimization Module 216 and determines the suitability of all combinations of report templates and returns the optimal subset of report templates. The report templates may be ranked based on a set of financial objectives that the customer wants to optimize or the customer's needs as defined by a set questions. The report templates may be ranked based upon a combination of both needs and financial objectives.

In accordance with an aspect of the invention, the vendor will offer for sale to the customer the subset of report templates that meets the customer's reporting objectives. Needs may be defined by qualitative terms or quantitative measures. Needs can be converted from qualitative terms to a quantitative measure by having the customer prioritize a series of questions. The needs of the customer can be quantified by the customer's assigned priorities.

A measure can be provided by the vendor or by polling previous customers. For example, an employee of the vendor reviews and rates a series of report templates. This rating could be refined through feedback received from customers (e.g., customer logging on to website to relay feedback). The suitability of a report is computed from data and metadata retrieved from a report template. For example, the data source a report intends to connect to is useful metadata. Another example, in the case of a report template that is a Business Objects Web Intelligence™ document, the semantic layer can be mined and the various dimensions and measures described therein can be used as metadata about the report template. The collection/computation of measures for how good particular reports are at answering questions is performed by Management Module 218 and/or Feedback Module 222. The data collected can be stored by these modules or with the report templates themselves.

An embodiment of the present invention uses values to determine if a particular report meets a customers needs. The value of a report template can be qualitatively defined as to what extent does the report template, or the report it creates, serve its purpose? Various quantitative expressions can be constructed. For example, a value metric can be defined as being proportional to the sum over all questions of the product of the question's priority and the ability of the report to answer the question. Mathematically, $$V_j = C \sum_{q \in Q} P_q \times A_{q,j},$$

where $V_j$ is the value of the j-th template, C is a constant, Q is the set of questions, $P_q$ is the priority of the q-th question, and $A_{q,j}$ is the ability of the j-th report to answer the q-th question.

Figure 3:
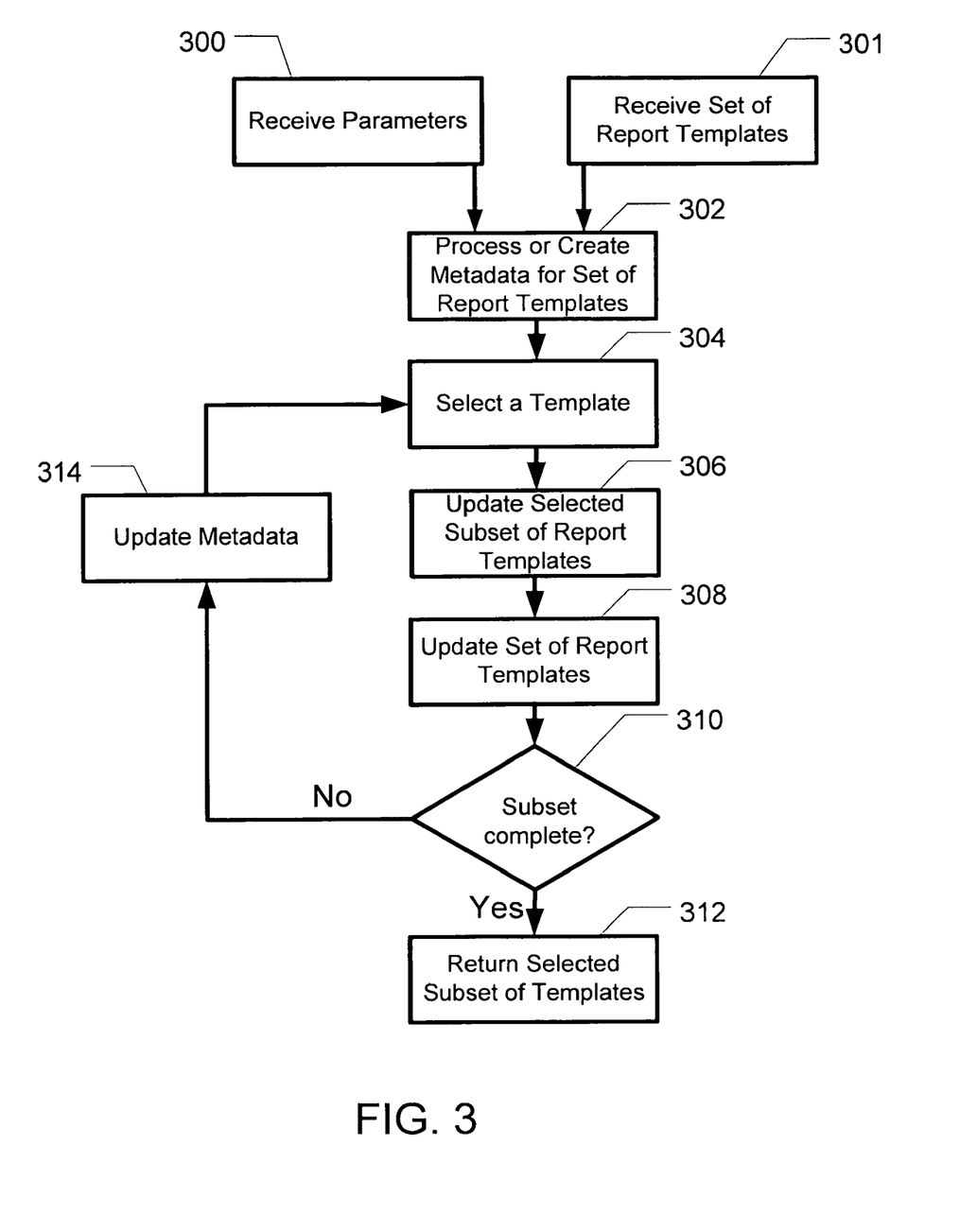
FIG. 3 illustrates processing operations associated with selecting a subset of report templates from a set of report templates in accordance with an embodiment of the invention.

FIG. 3 illustrates processing operations associated with one embodiment of the invention. Initially, the system 200 receives a set of customer-specific parameters 300 and/or a set of report templates 301. In an embodiment, the operation of receiving these customer-specific parameters is handled by Input/Output Module 212. The operation may include automated parameter extraction from some datasource, manual parameter entry with or without prompting, or a combination thereof. Receiving a set of customer-specific parameters 300 can include retrieving the set of customer-specific parameters from a remote source. The customer-specific input parameters may include: a prioritization of questions, rules for selecting a report template and the overall objective in selecting a subset of report templates (e.g., find minimum number of report templates that answer the specified questions). These customer-specific input parameters may include:

an objective that the deployment of report templates is to effect;

a proposed subset of report templates from the all available report templates that a customer is considering deploying;

a set of report templates that the customer has already deployed and wishes to augment;

a list of customer prioritizations for a set of questions;

a model for determining the costs of deploying each report template, e.g., vendor price plus internal installation costs; or a set of rules.

In an embodiment of the present invention, the customer-specific input parameters include a mix of objectives to be optimized, e.g., financial objectives, values, and rules. The process of finding a subset of templates, e.g., the processing operations of FIG. 3, can be run multiple times with a different set of customer-specific input parameters to ensure that the most suitable subset of templates is found.

In a processing operation of FIG. 3 a set of report templates is received 301. The set can be received from the Management Module 218 and/or List Module 220. The set of report templates is included in the list of parameters received in operation 300. The set of report templates and the list of parameters are used to create metadata that facilitates the selection of report templates.

Figure 4:
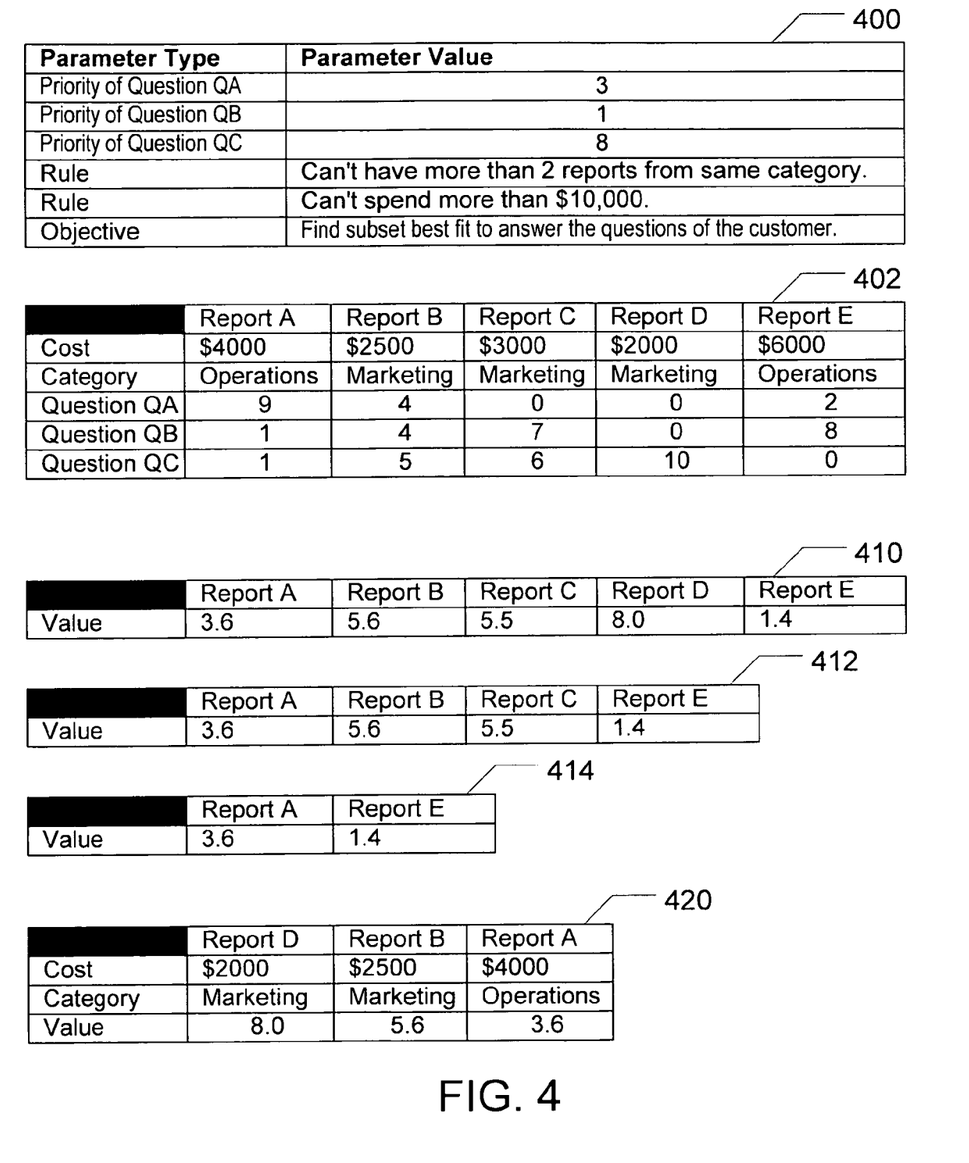
FIG. 4 illustrates an example of an iterative selection of a subset of report templates using the processing operations of FIG. 3
Figure 6:
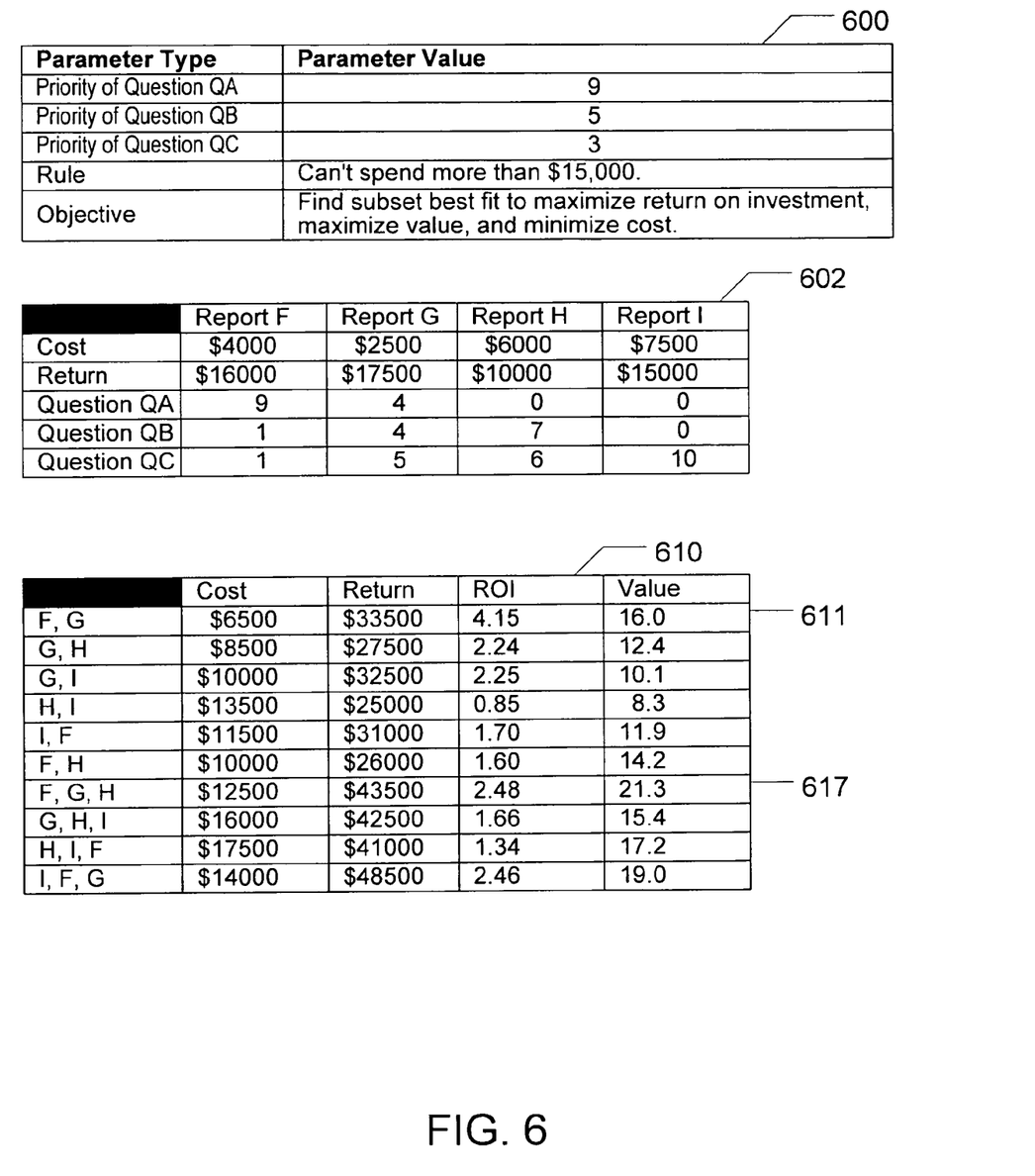
FIG. 6 illustrates an example of selecting an optimal subset of report templates using the processing operations of FIG. 5.

After operation 300 or 301, the metadata associated with a set of report templates is created or processed 302. The metadata can takes many forms including a table (e.g., database table), a text file, dedicated data structure, or the like. The metadata associated with the set of report templates is created from the set of report templates and the list of parameter received in operations 300 and 301. Alternatively, the metadata associated with the set of report templates is processed by extracting data from the set of report templates. An example of data that is extracted to become metadata is the category of the report template such as finance, operations, or marketing. Examples of metadata for sets of report templates are shown in FIGS. 4 and 6. The metadata for each template describes how suitable each report is to the customer. The metadata contains measures and metrics to make the selection quantitative.

There can be two types of metadata in the set of report templates with associated metadata: static metadata and dynamic metadata. Cost can be a static descriptor or a dynamic metric. Cost is static metadata when the cost of the report is fixed. Cost is dynamic when the cost changes as report templates are selected. Cost can also be variable, e.g., cheaper with volume, better price, or more accurate forecasting.

Next, a report template is selected 304. The selected report template is added to the selected subset of report templates 306. The selection is often greedy, i.e., the report template with the best fit to the reporting objective is selected. Then, the selected template is removed from the set of report templates 308.

A determination is made by Selection Module 214 as to whether to terminate the selection process 310. Examples of termination conditions include budget exceeding expenditure, the selected subset being complete, the set of report templates being empty, or no report templates that meet a given selection rule remaining in the set. If the subset is not yet complete, iteration occurs, 310-No. In an embodiment of the present invention, the metadata associated with the set of report templates is updated 314. For example, the metadata associated with the report templates remaining in the set of report templates can be updated to reflect inter report template dependencies or synergies. Otherwise, 310-Yes, the processing continues to return a selected subset of templates 312. Optionally, the selected subset is displayed to the client-side of system 200 according to instruction in the Input/Output Module 212.

FIG. 4 shows an example of the processing operations in FIG. 3, specifically, iteratively selecting templates from a set of report templates until a useful subset of reports is found. A set of customer-specific parameters which could be received in operation 300 is shown as table 400. Table 400 includes parameter type and parameters value pairs. The customer's prioritization of a series of questions (Questions QA, QB and QC) is given on a numeric scale. In FIG. 4 a 10 point scale with "1" being low and "10" high is assumed. Table 400 includes two rules that will restrict the selection process and control when the iterative selection process terminates.

As shown in FIG. 4, a subset of report templates can be selected by an iterative process. A set of report templates that may be selected and associated metadata 402 is created or processed with or without reference to the set of customer-specific parameters 400. A selection table 410 as an example of a set of report templates with associated metadata is created, e.g., in operation 302 of a first iteration. Given selection table 410, Report D will be selected during the first iteration because Report D has the highest value, 8.0. Report D is added to the selected subset, e.g., operation 306. Report D is removed from the listing of templates, e.g., operation 308. There is no termination condition, i.e., the budget exceeds expenditure, so iteration occurs.

In this iteration, the selection table is updated to be as before but without Report D, resulting in table 412. In operation 304 of a second iteration, Report B will be selected since it has the value 5.6. Report B is added to the selected subset and is removed from the listing of templates. Report C is then removed from the selection table per the first rule in the set of customer-specific parameters 400, i.e., "can't have more than 2 reports from same category". Report C, a marketing report, is excluded because another marketing report, Report D, was previously selected. Report A will be selected in the third iteration. As no termination condition has been reached, yet another iteration occurs. However, no report template can be added in this iteration without violating the second the rule of table 400. This is a termination condition and the subset is now complete.

The subset of selected templates 420 is returned (processing operation 312 of FIG. 3). The subset can be displayed to the user on client computer, e.g., 250 in system 200.

Figure 5:
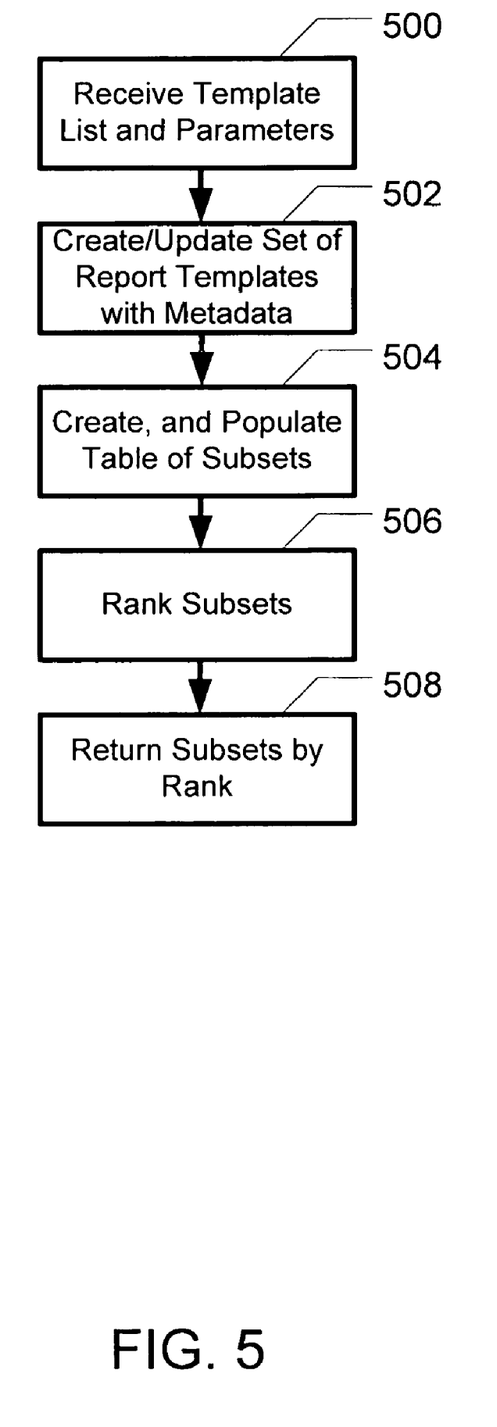
FIG. 5 illustrates processing operations associated with selecting an optimal subset of reports from a plurality of reports in accordance with an embodiment of the invention.

FIG. 5 illustrates processing operations associated with determining the suitability of all combinations of report templates and returning the optimal subset of report templates in accordance with an embodiment of the invention. First, a list of customer-specific parameters is received 500. A set of report templates can also be received. Next, metadata associated with a set of report templates is created 502.

A data structure to track all combinations of report templates, e.g., all subsets, is created 504. In an embodiment, the data structure is a table of subsets. Also in operation 504, the table of subsets is populated; that is, a total metric is given for each subset in the table of subsets. The metric can be the cost of each subset. Other metrics and measures could be used. The table of subsets could be exhaustively searched leading to the optimal subset. Alternatively, the table of subsets could be limited for performance reasons.

The method for finding the optimal (or near optimal) subset of report templates can employ known searching techniques. These techniques, known to a person of ordinary skill in the art, include: exhaustive searching, dynamic programming, the downhill simplex method, searches that behave like genetic algorithms, simulated annealing, and the like. The more efficient of these techniques are advantageous when the size of a set is large. This is because if there are n report templates in a set of report templates, there are about $2^n$ non-empty subsets of report templates possible.

Next, the subsets are ranked. The subsets are then returned by rank 508. The ranking of subsets may be displayed at the client-side via the Input/Output Module 212.

Shown in FIG. 6 is an example of selecting an optimal subset of templates by examining the suitability of all subsets of templates. In FIG. 6 an exhaustive search is used, but other methods are viable.

A set of customer-specific parameters, for example received in operation 500, is shown as table 600. Table 602 is a listing of templates that may be selected. The table 602 is constructed with or without reference to the set of customer-specific parameters of table 600. A table of subsets 610 is created, e.g., using operation 504 of FIG. 5. The rows of the table of subsets 610 are the subsets. The columns are cost (e.g., price plus deployment cost), return, return on investment (e.g., linear ROI), and value (e.g., the value formula provided above, with $C=\frac{1}{10}$). The table of subsets 610 is populated with data which can be used to select the optimal subset of templates. Given the subsets and associated data in the table of subsets 610, the optimal subset depends on what part of the objective is most important. The object, i.e., objective in a set of customer-specific parameters 600, includes "maximize return on investment, maximize value, and minimize cost". The subset with the maximum return on investment, with out exceeding budget is Report F and Report G, row 611. Row 617 shows the subset with the maximum value, with out exceeding budget. Row 617 also has the total maximum return. The example in FIG. 6 could be repeated with the budget split over multiple time periods, e.g., quarters.

Figure 7:
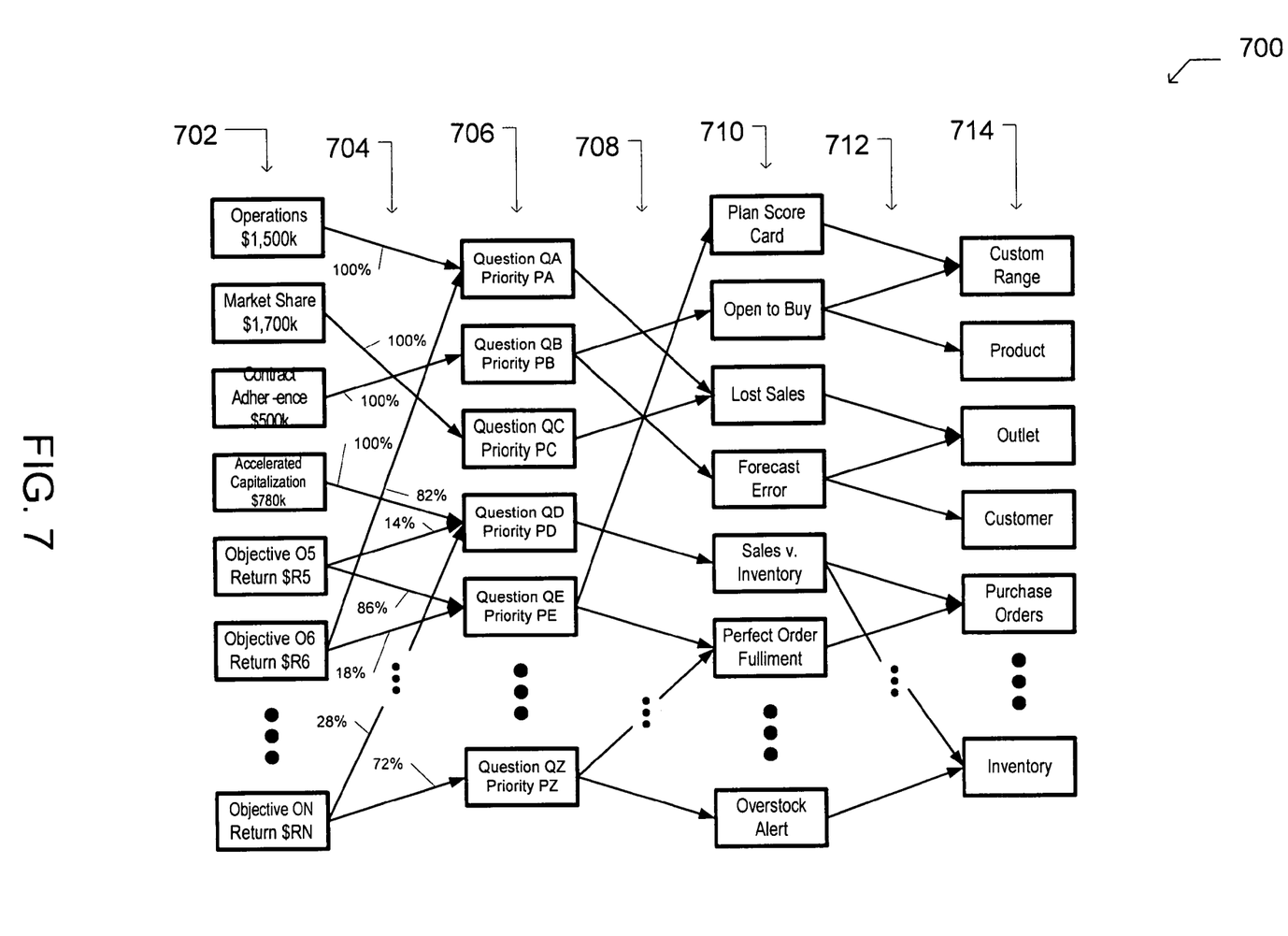
FIG. 7 illustrates a schematic of variables and entities which may be used for selecting a subset of report templates in accordance with an embodiment of the invention.

FIG. 7 illustrates a schematic of variables and entities which may be used for selecting a subset of report templates. These variables and entities are used to create a metric to determine if a particular report meets a customer's needs. Graph 700 shows how templates can be selected based on: the areas of potential benefit to a customer; a set of questions; a set of prioritizations for the question; a set of reports; a set of sub reports; and a set of edges relating the foregoing elements. Graph 700 shows a more complicated metric used to determine if a particular report meets a customer's needs. FIG. 7 is exemplary and is presented for illustration purposes only.

Graph 700 illustrates the areas of potential benefit to a customer 702. Each area of benefit has an estimated return associated with it, e.g., Accelerated Capitalization with $780k. The estimated return can be created by the customer or an expert from the report vendor. The areas of benefit can be drawn from a universal set or a smaller list of areas created by an expert from the vendor or by the customer. These areas of benefit 702 are linked to a set of questions 706 by a set of edges 704. The set of edges can be binary or weighted. The edges 704 can be defined by an expert, e.g., the vendor. The edges leaving each area of benefit sum to 100%. Each question from the set of questions, e.g., business questions, has an associated prioritization. The associated prioritization can be a customer rating for the question. The linking of the areas of benefit 702 to the questions 706 has the following semantics. Realizing a benefit involves answering one more questions. The ability to answer questions may be predicated on having access to a series of reports, such as, the set of reports 710 that is linked to the questions 706 by edges 708.

Included in FIG. 7 are a set of reports 710 and a set of sub reports 714. The dependency between the report 710 and the sub report 714 is shown by edges 712. A report can be a report, an analytic, a BI document, or a template for a report, and the like. Shown here as an example, the report 710 and the sub reports 714 are a set of analytics and underlying tables.

In an embodiment of the present invention the benefits of implementing more than one report are complimentary, while the costs are shared. The cost of implementing a set of report templates can be a dynamic piece of metadata. The cost could be updated to reflect inter report template dependencies and synergies. A report that depends on a sub report, e.g., an underlying table for an analytic, will be cheaper to implement if the sub report has already been implemented or its implementation is planned. This is an example of an inter report synergy where more reports lead to cheaper cost per report. An example of synergy involves the Lost Sales and Error Forecast reports in the set of reports 710. These reports address different questions, i.e., respectively QA and QC, and QB. As a consequence, the reports don't overlap in the benefit they provide the user of the reports. The reports of the instant example, however, share a sub report, i.e., Outlet, and, as consequence, they share the cost of implementation for that sub report. In some examples more reports increases costs, because an extra report has dependencies or concurrency requirements. In some examples, more reports increase costs, because they need additional tables but contribute with little extra benefit.

In an embodiment, a costing model for determining the costs associated with deploying each report template in a set of report templates is metadata to each report template. The costing model can be implemented by executable instruction in system 200, e.g., in Selection Module 214. The costing model can tabulate the cost of a report template's implementation by vendor and customer costs. For example, in the case of vendor costs, the model could compute a cost based on the cost of a license, the hourly cost of a consultant, the estimated time to configure a report or database schema for analytics, and the like. These values could depend on other measures, for example, size of database by record, location of customer relative to vendor, overhead for consultants. In the case of customer costs, the model could compute a cost based on percentage of data needing conversion, the cost of downtime, the expected usage of a report, and the like.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium with executable instructions, comprising instructions to:
   process metadata associated with a set of report templates;
   select a subset of report templates from the set of report templates using the metadata to form an iterative selection, wherein the subset of report templates maximizes a reporting objective subject to a selection rule as specified by the metadata, wherein the executable instructions to select include executable instructions to
   select a first report template from the set of report templates;
   remove the first report template from the set of report templates, and
   insert the first report template into the subset of report templates;
   return the subset of report templates; and
   display the subset of report templates.

2. The computer readable storage medium of claim 1 further comprising executable instructions to update the set of metadata to reflect the removal of the first report template from the set of report templates.

3. The computer readable storage medium of claim 1 further comprising executable instructions to remove a second report template from the set of report templates.

4. The computer readable storage medium of claim 1 wherein the instructions to select the subset of report templates from the set of report templates utilize a greedy process.

5. The computer readable storage medium of claim 1 wherein the instructions to select the subset of report templates from the set of report templates utilize a global selection process.

6. A computer readable storage medium with executable instructions, comprising instructions to:
   process metadata associated with a set of report templates;
   select a subset of report templates from the set of report templates using the metadata, wherein the subset of report templates maximizes a reporting objective subject to a selection rule as specified by the metadata, wherein the executable instructions to select include executable instructions to create a ranking for a plurality of subsets drawn from the set of report templates;
   return the subset of report templates and the ranking for the plurality of subsets; and
   display the subset of report templates.

7. The computer readable storage medium of claim 6 wherein the instructions to select the subset of report templates from the set of report templates utilize an optimized search over a plurality of subsets drawn from the set of report templates.

8. The computer readable storage medium of claim 6 wherein the instructions to process the set of metadata include instructions to compute a metric.

9. The computer readable storage medium of claim 6 wherein the instructions to process metadata include instructions to construct a selection table including a set of dynamic metadata and a set of static metadata.

10. The computer readable storage medium of claim 6 further comprising executable instructions to offer for sale the subset of report templates.

11. The computer readable storage medium of claim 6 wherein metadata includes an element of metadata selected from the group consisting of:
    a second plurality of report templates; and
    a plurality of names for the second plurality of report templates.

12. A computer readable storage medium with executable instructions, comprising instructions to:
    process metadata associated with a set of report templates;
    select a subset of report templates from the set of report templates using the metadata, wherein the subset of report templates maximizes a reporting objective subject to a selection rule as specified by the metadata;
    return the subset of report templates; and display the subset of report templates;
    wherein the metadata includes an element of metadata selected from the group consisting of:
      a model determining costs associated with deploying the subset of report templates;
      a model for inter report template dependencies; and
      a model for inter report template synergies.

13. A computer readable storage medium with executable instructions, comprising instructions to:
    process metadata associated with a set of report templates;
    select a subset of report templates from the set of report templates using the metadata, wherein the subset of report templates maximizes a reporting objective subject to a selection rule as specified by the metadata;
    return the subset of report templates; and
    display the subset of report templates;
    wherein the metadata includes an element of metadata selected from the group consisting of:
      a question; and
      a rating for the question.

14. A computer implemented method comprising:
    specifying a reporting objective;
    receiving metadata for a first set of report templates; and
    applying the reporting objective to select a subset of report templates from the first set of report templates based on the metadata;
    wherein the metadata includes an element of metadata selected from the group consisting of:
      a second set of report templates;
      a selection rule;
      a question;
      a rating for the question; and a model determining costs associated with deploying the subset of report templates.

15. The method of claim 14 further comprising processing the metadata such that a metric for each report template in a representative subset of report templates from the first set of report templates is computed.

16. The method of claim 14 further comprising constructing a selection table for the set of report templates based on the metadata.

17. The method of claim 14 wherein the reporting objective is an objective of a customer.

* * * * *